Patented Mar. 1, 1938

2,109,579

UNITED STATES PATENT OFFICE 2,109,579

BRUSH BRISTLES AND METHOD OF MAKING THE SAME

William F. Talbot, Framingham, Mass., assignor to Pro-phy-lac-tic Brush Company, Northampton, Mass., a corporation of Delaware No Drawing. Application July 27, 1935, Serial No. 33,621

2 Claims. (Cl. 91—68)

This invention relates to brush bristles and a method of treating them to increase their utility. In the preparation of animal bristles for the manufacture of brushes such as tooth brushes, it has been proposed to treat the bristles with a wax-like substance such as paraffin wax, dissolved in an organic solvent. This treatment has the effect of rendering the bristles water repellent. For some purposes it may be desirable that they retain their original water-absorptive properties or even have increased capacity for absorbing water after the wax treatment.

Accordingly, the present invention contemplates treating previously washed or bleached brush bristles with a liquid containing a wax-like or other water repellent substance and at the same time increasing their water-absorptive properties. To accomplish this result, I make a solution of the wax-like or other water-repellent substance in an organic solvent, such as toluene or carbon tetrachloride, and add to it preferably a new substance which has the property of increasing the capacity of the bristles for absorbing water. The bristles are immersed in this liquid for a suitable length of time and are then dried.

While materials such as sulfonated castor oil, oleic acid and Turkey red oil in which the hydrogen of the acidic group has been replaced by an inorganic basic group such as sodium, potassium or ammonium may be used to give increased water-absorptive properties, better results have been obtained when neutralization is accomplished by means of an organic base such as triethanolamine. The best results have been obtained by using a new chemical substance made by chemically combining triethanolamine with the organic acids derived from Gardinol. This new material is conveniently referred to as T. E. A. G.

Gardinol is a commercial product which has recently come on the market and is believed to consist of long-chain aliphatic alcohols, such as lauryl alcohol, which have been treated with sulfuric acid to form the alcohol hydrogen sulphate and which have subsequently had the hydrogen neutralized or replaced by a metal, such as sodium. To produce T. E. A. G. Gardinol is treated with sulfuric acid and the free alcohol hydrogen sulfate is recovered by extraction and then neutralized with triethanolamine to form the triethanolamine salt of the acids which occur in the form of sodium salts in Gardinol.

The following are specific examples illustrating the practice of the invention:

1. Nine grams of paraffin wax are dissolved in 300 cc. of toluene and to this solution are added 6 grams of 75% Turkey red oil. A suitable bundle of Chungking bristles is then immersed in this solution for ten minutes at 100° F. The surplus liquid is then drained off and the bristles are dried at 122° F. for thirty minutes. The dried bristles upon soaking in water at room temperature for thirty minutes absorb 29.5% of water, whereas a similar grade of untreated bristles absorbs 25% of water under the same conditions.

2. A solution containing 3% of paraffin wax and 0.03% of T. E. A. G. in carbon tetrachloride is prepared and toothbrushes are immersed therein. After removal and drying at 120° F. it is found that brushes so treated have a water absorption practically identical with untreated brushes.

3. Another suitable method for treatment of bristles for use in brushes consists in immersing of suitable bristles for five minutes in a 3% solution of paraffin wax in carbon tetrachloride to which has been added 0.07% of triethanolamine oleate. After drying, bristles so treated show a water absorption upon soaking essentially the same as that for untreated bristles.

I claim:

1. The method of treating brush bristles which comprises immersing the bristles in a solution of a water repellent substance and a wetting agent in an organic solvent, and thereafter drying the bristles at a sufficient temperature and time period for depositing the water repellent and wetting agents on the bristles and forming water absorptive bristles.

2. Water absorptive brush bristles impregnated with a water repellent waxy substance and a water absorptive agent, said water absorptive agent rendering the bristles water absorptive notwithstanding the presence of the waxy substance.

WILLIAM F. TALBOT.